US007822124B1

(12) United States Patent  
Rezvani

(10) Patent No.: US 7,822,124 B1  
(45) Date of Patent: Oct. 26, 2010

(54) METHOD AND APPARATUS FOR ADAPTIVE ITERATIVE DECISION FEEDBACK CONTROL CODING IN MODEMS

(75) Inventor: Behrooz Rezvani, San Ramon, CA (US)

(73) Assignee: Ikanos Communications Inc., Fremont, CA (US)

( * ) Notice: Subject to any disclaimer, the term of this patent is extended or adjusted under 35 U.S.C. 154(b) by 1344 days.

(21) Appl. No.: 11/175,794

(22) Filed: Jul. 5, 2005

Related U.S. Application Data

(60) Provisional application No. 60/585,015, filed on Jul. 2, 2004, provisional application No. 60/611,583, filed on Sep. 21, 2004.

(51) Int. Cl.
*H04N 7/12* (2006.01)
*H04B 7/00* (2006.01)

(52) U.S. Cl. .................. 375/240.27; 375/222; 455/522
(58) Field of Classification Search ................. 375/222, 375/240.27; 455/522; 714/699
See application file for complete search history.

(56) References Cited

U.S. PATENT DOCUMENTS

| | | | |
|---|---|---|---|
| 5,832,387 A * | 11/1998 | Bae et al. ..................... 455/522 |
| 6,163,861 A * | 12/2000 | Yoshioka et al. ............ 714/712 |
| 6,266,348 B1 * | 7/2001 | Gross et al. ................. 370/493 |
| 6,456,649 B1 * | 9/2002 | Isaksson et al. ............. 375/222 |
| 6,965,780 B1 * | 11/2005 | Monogioudis et al. ...... 455/522 |
| 6,983,409 B1 * | 1/2006 | Vollmer et al. .............. 714/748 |
| 2002/0077140 A1 * | 6/2002 | Monogioudis et al. ...... 455/522 |
| 2002/0196812 A1 * | 12/2002 | Yamaguchi et al. ......... 370/474 |
| 2003/0035170 A1 * | 2/2003 | DeGrange, Jr. ............. 359/124 |
| 2003/0097623 A1 * | 5/2003 | Razavilar et al. ........... 714/704 |
| 2004/0151108 A1 * | 8/2004 | Blasco Claret et al. ...... 370/206 |
| 2005/0031025 A1 * | 2/2005 | Xie et al. .................... 375/222 |

* cited by examiner

*Primary Examiner*—Mohammad H Ghayour
*Assistant Examiner*—Sarah Hassan
(74) *Attorney, Agent, or Firm*—IP Creators; Charles C. Cary

(57) ABSTRACT

A modem employing feedback control coding to dynamically control signal-to-noise ratios and to identify errored codewords for retransmission. The receive path components of the modem include a signal-to-noise estimator, a feedback controller and a dynamic demapper. The signal-to-noise estimator repeatedly determines a difference between a target signal-to-noise ratio (SNR) and actual SNR in communications received from an opposing modem. A feedback controller responds to each determination by the signal-to-noise controller to send to the opposing modem a set of modified transmit control parameters for reducing the difference between the target and actual SNRs. The dynamic demapper dynamically alters constellation size or power spectral density for demapping communications received from the opposing modem responsive to a change in transmission parameters thereof resulting from the modified set of transmit control parameters.

1 Claim, 8 Drawing Sheets

QOS Modem with Feedback Controlled SNR and Error Correction

Modems with Feedback Controlled Signal-to-Noise Ratios

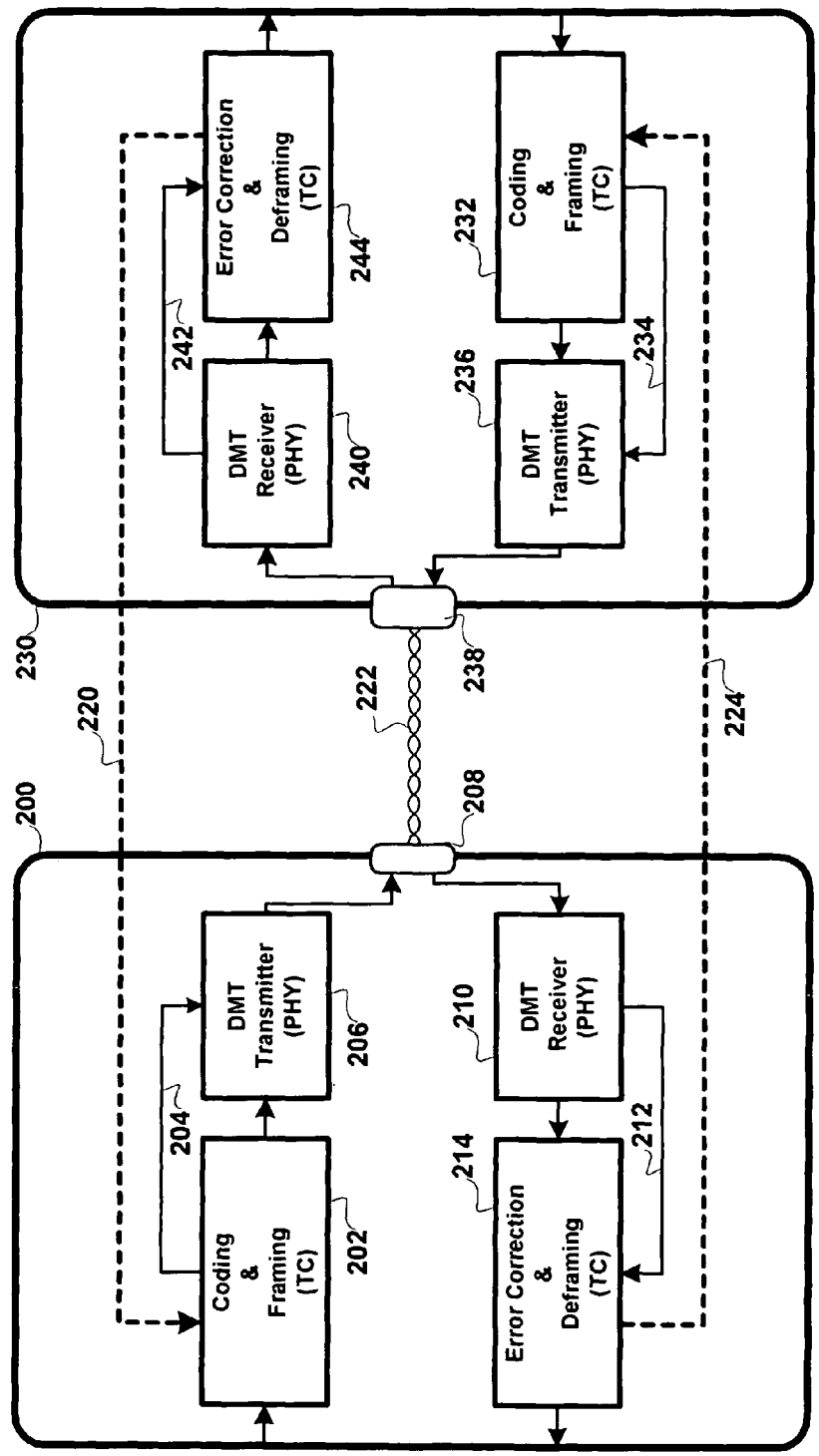
Modems with Feedback Controlled Error Correction    FIG. 2A
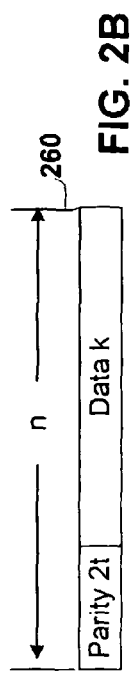
FIG. 2B Modems with Quality of Service Dependent Traffic Control

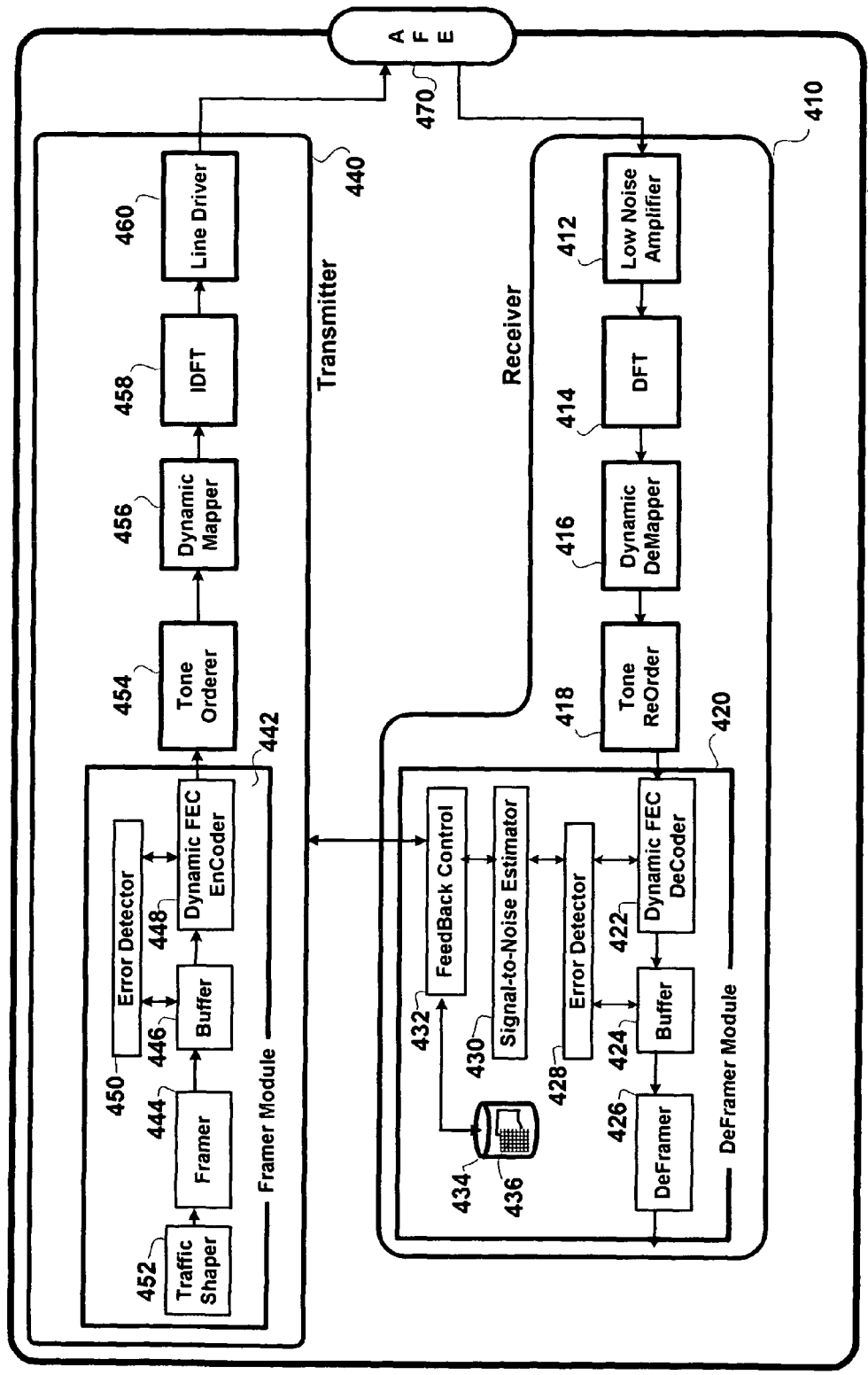
FIG. 4   QOS Modem with Feedback Controlled SNR and Error Correction

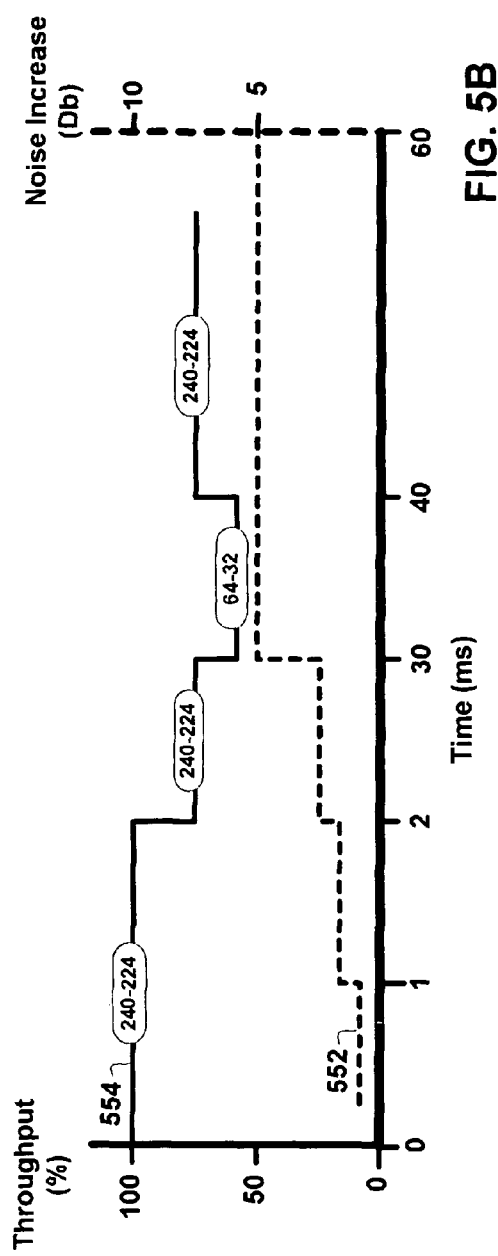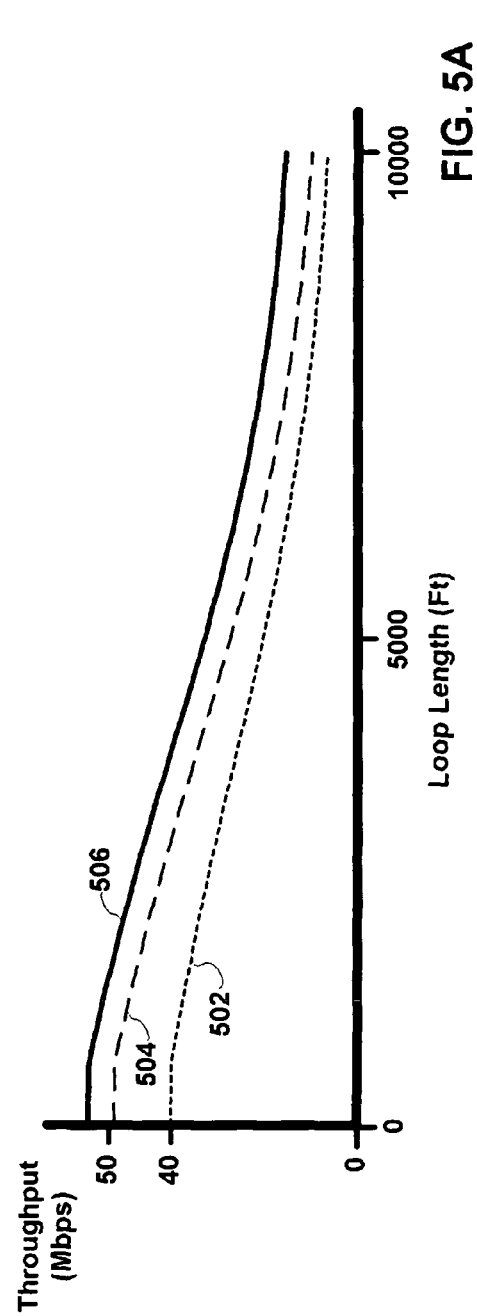

**Modem Receive Path
Dynamic Feedback Control Processes**

**Modem Transmit Path
Dynamic Feedback Control Processes**

METHOD AND APPARATUS FOR ADAPTIVE ITERATIVE DECISION FEEDBACK CONTROL CODING IN MODEMS

CROSS REFERENCE TO RELATED APPLICATION

This application claims the benefit of prior filed co-pending Provisional Application No. 60/585,015 filed on Jul. 2, 2004 entitled "Application of Feedback Decoding in DSL" and co-pending Provisional Application No. 60/611,583 filed on Sep. 21, 2004 entitled "Systems Architecture for Iterative Feedback Coding for DSL" each of which is incorporated herein by reference in its entirety as if fully set forth herein.

BACKGROUND OF THE INVENTION

1. Field of Invention

The present invention is generally related to modems, and more particularly to digital modems.

2. Description of the Related Art

Residential consumers are showing an increasing appetite for high speed real time services such as IP Telephony, online gaming, video conferencing, SDTV and HDTV and video on demand. These services not only require high date rates but also uninterrupted delivery. Traditional digital subscriber line (DSL) modems have limited ability to meet the service levels required for delivery of these services. These limitations included limited loop length, high noise margins, and service interruptions due to standard specified retraining protocols.

What is needed are means for increasing the throughput and service levels associated with DSL and other wire line modems.

SUMMARY OF THE INVENTION

A method and apparatus for a wire line modem with improved throughput and service levels is disclosed. The modem employs feedback control coding to dynamically control signal-to-noise ratios and to identify errored codewords for retransmission. The modem operates at noise margins orders of magnitude less than prior art modems, thereby allowing an increase in throughput. The modem may be operated without the requirement of retraining and the interruptions in service associated therewith. The modem is suitable for delivery of high speed real time services such as: IP Telephony, online gaming, video conferencing, SDTV and HDTV and video on demand.

In an embodiment of the invention a pair of modems each having a transmit and receive path configured to couple to opposing ends of a wire line communication medium is disclosed. The first of the pair of modems includes a signal-to-noise estimator and a feedback controller. The second of the pair of modems includes a transmitter. The signal-to-noise estimator of the first of the pair of modems is configured to repeatedly determine a difference between a target signal-to-noise ratio (SNR) and actual SNR in received communications. The feedback controller of the first of the pair of modems includes responsiveness to each determination by the signal-to-noise controller to send to the second of the pair of modems a set of modified transmit control parameters for reducing the difference between the target and actual SNRs. The transmitter of the second of the pair of modems comprises a plurality of components coupled to one another to form the transmit path and selected ones of the plurality of components include responsiveness to the set of modified transmit control parameters received from the first of the pair of modems to adjust corresponding transmit control parameters of the plurality of components, thereby effecting a reduction in the difference between the target and actual SNRs in the communications received by the first of the pair of modems.

In an alternate embodiment of the invention a modem is disclosed. The receive path components of the modem include a signal-to-noise estimator, a feedback controller and a dynamic demapper. The signal-to-noise estimator is configured to repeatedly determine a difference between a target signal-to-noise ratio (SNR) and actual SNR in communications received from an opposing modem. The feedback controller is configured to respond to each determination by the signal-to-noise controller to send to the opposing modem a set of modified transmit control parameters for reducing the difference between the target and actual SNRs. The dynamic demapper dynamically alters constellation size or power spectral density for demapping communications received from the opposing modem responsive to a change in transmission parameters thereof resulting from the modified set of transmit control parameters.

BRIEF DESCRIPTION OF THE DRAWINGS

These and other features and advantages of the present invention will become more apparent to those skilled in the art from the following detailed description in conjunction with the appended drawings in which:

FIG. 2A is a hardware block diagram of an opposing pair of modems with feedback controlled error correction in accordance with an embodiment of the invention.

FIG. 2B is a data structure diagram of a representative forward error correction to codeword for encoding transmitted data in the modems shown in FIG. 2A, in accordance with an embodiment of the invention.

FIG. 4 is a hardware block diagram of a modem with feedback controlled signal-to-noise ratios and error correction in accordance with an embodiment of the invention.

FIG. 5A is a graph of throughput versus loop length for the embodiment of the modem shown in FIG. 4.

FIG. 5B is a graph of the throughput versus time and noise versus time for the embodiment of the modem shown in FIG. 4.

DETAILED DESCRIPTION OF THE EMBODIMENTS

A modem supporting multi-tone modulation protocols over a wired communication medium is disclosed. The modem supports frequency division multiplexed communications in proprietary and standard band plans such as those associated with X-DSL, i.e. ADSL and VDSL and variants thereof. In an alternate embodiment of the invention the modem supports orthogonal frequency division multiplexing (OFDM). In OFDM available bandwidth is subdivided into a number of discrete sub-channels that are overlapping and orthogonal to each other. Each channel has a corresponding frequency range. Data is transmitted in the form of symbols with a predefined duration. The data can be encoded in amplitude and/or phase, using encoding methods such as Binary Phase Shift Key (BPSK), Quadrature Phase Shift Key (QPSK), m-point Quadrature Amplitude Modulation (m-QAM).

All digital communication experiences signal interference, and communication protocols which support multiple sub-channels such as DMT and OFDM are no exception. Interference can effect both the amplitude and the phase of the sub-channels. At the receiver the data has to be separated from the noise. One popular technique for achieving the separation of data from the noise in a received signal is known as in-channel forward error correction (FEC). FEC introduces additional redundant bits into communications between modems and additional processing overhead to handle the transmission and reception of a stream of digital information. The redundant bits are added at the transmitter by application of any of a number of FEC algorithms in a process known as encoding the data. At the receiver the same algorithm is performed to detect and remove errors in the transmitted data in a process known as decoding the signal.

With each improvement in bandwidth of multiple sub-channel communication systems there is a corresponding increase in noise, with the potential to reduce signal integrity to unacceptable levels. The modem of the current invention provides the signal integrity required to support high transmission rates and service level requirements.

In each of the Figures the reference numbers for elements introduced in each Figure correspond with the number of the Figure. For example elements referenced in FIG. 1 have reference numbers between 100-199. Elements referenced in FIG. 2 have reference numbers between 200-299, and so forth. For purposes of clarity elements first referenced in an earlier Figure may again appear in a subsequent figure.

Figure 1:
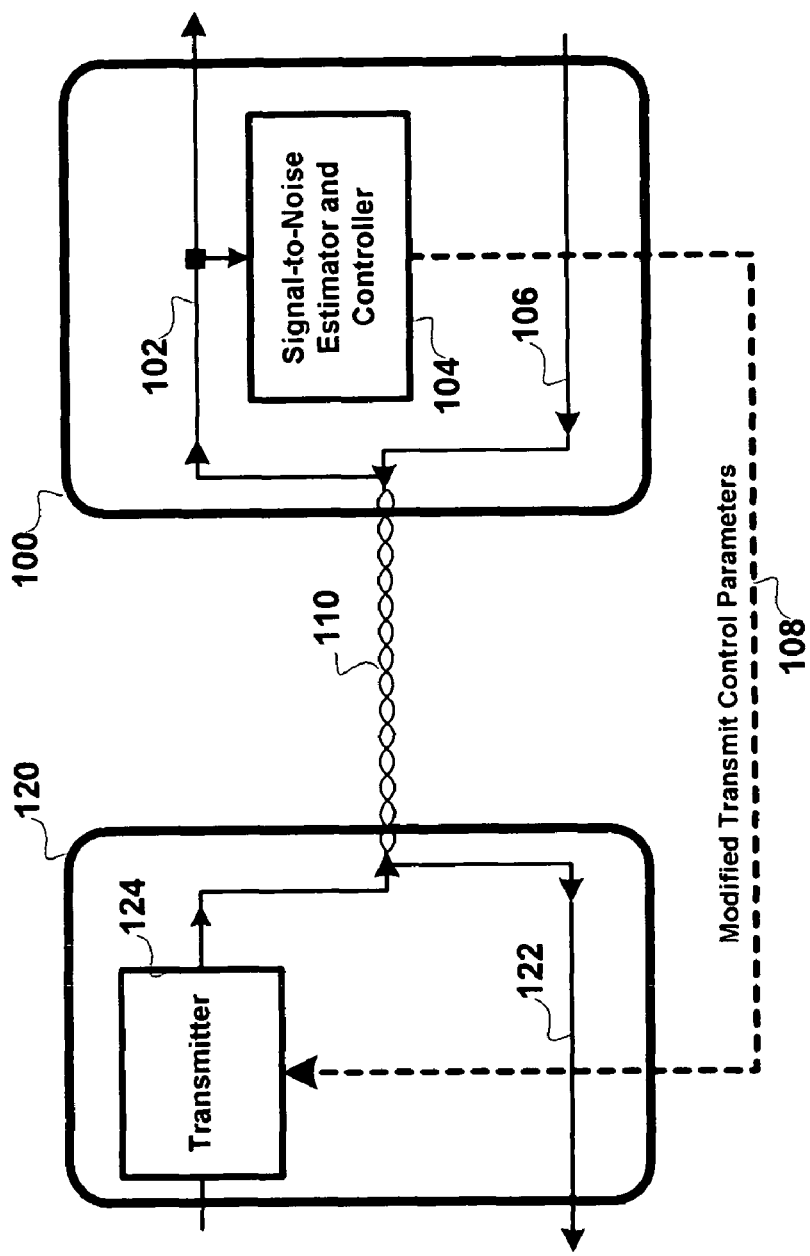
FIG. 1 is a hardware block diagram of an opposing pair of modems with feedback controlled signal-to-noise ratios in accordance with an embodiment of the invention.

FIG. 1 is a hardware block diagram of an opposing pair of modems 100, 120 with feedback controlled signal-to-noise ratios in accordance with an embodiment of the invention. Modems 100 and 120 couple to one another via wire line 110. Modem 100 includes a receive path 102 and a transmit path 106. The receive path 102 of modem 100 includes a signal-to-noise estimator and controller 104. Modem 120 includes a receive path 122 and a transmitter 124. The signal-to-noise estimator and controller of modem 100 repetitively estimates signal-to-noise levels in received communications and repetitively determines modified transmit control parameters such as: Forward Error Correction (FEC) codeword size, FEC codeword rate, power spectral density (PSD) and constellation size to reduce to reduce a difference between actual and target signal-to-noise ratios (SNR) for communications from the opposing modem. The signal-to-noise estimator and controller logically feedback 108 these modified control to the transmitter of modem 120. Feedback actually takes place from the controller to the transmit path 106 over the subscriber line 110 to the receive path of modem 120 and from there to the transmitter 124 of that modem. The transmitter and receiver synchronize the changeover to the modified transmission control parameters without interruption of data transport across the subscriber line. This avoids retraining and the interruptions of throughput associated therewith and keeps the communication channel between modems 120 and 100 'always live'.

FIG. 2A is a hardware block diagram of an opposing pair of modems 200, 230 with feedback controlled error correction in accordance with an embodiment of the invention. The modems couple to one another via subscriber or other wire line 222. Modem 200 includes a transmit path comprising coding and framing component 202 and a discrete multi-tone transmitter (DMT) component 206 which handle communications at the transport control and physical layer respectively. The DMT transmitter couples via analog front end 208 to subscriber line 222. Modem 200 includes a receive path comprising a DMT receiver 210 and an error correction and deframing component 214 operating at the physical and transport layers respectively. The input of the DMT receiver couples to the AFE 208.

Modem 230 includes similar components on the transmit and receive paths. Specifically, the transmit path comprises coding and framing component 232 and a DMT component 236 which handle communications at the transport control and physical layer respectively. The DMT transmitter couples via analog front end 238 to subscriber line 222. Modem 230 includes a receive path comprising a DMT receiver 240 and an error correction and deframing component 244 operating at the physical and transport layers respectively. The input of the DMT receiver couples to the AFE 238. The feedback loop 220 from the error correction unit 244 of the receiver of modem 230 to the coding and framing component 202 of the transmitter of modem 200 is shown logically. Feedback control from the receiving modem to the transmitter of the opposing modem is used to identify errored codewords for retransmission and modified control parameters for transmission. The modified control parameters and/or errored codeword identifiers are feed forward 204 by the transport control layer to the physical layer DMT transmitter 206. On the receiver of the opposing modem 230 side info such as analog power levels are fed forward 242 from the physical layer DMT receiver 240 to the transport control layer error correction and deframing component to allow improved determinations of optimal modulation control parameters. Similar feedback 224 and feedforward links 234 and 212 are shown for the receiver of modem 200 and the transmitter of modem 230.

FIG. 2B is a data structure diagram of a representative forward error correction codeword for encoding transmitted data in the modems shown in FIG. 2A, in accordance with an embodiment of the invention. A block type FEC codeword, Reed-Solomon, is shown of length 'n' bytes comprised of a user data or message portion of length k bytes and a parity byte portion of 2t bytes. In alternate embodiments of the invention the FEC codeword may be generated by other FEC block or convolutional codes without departing from the scope of the claimed invention.

Figure 3:
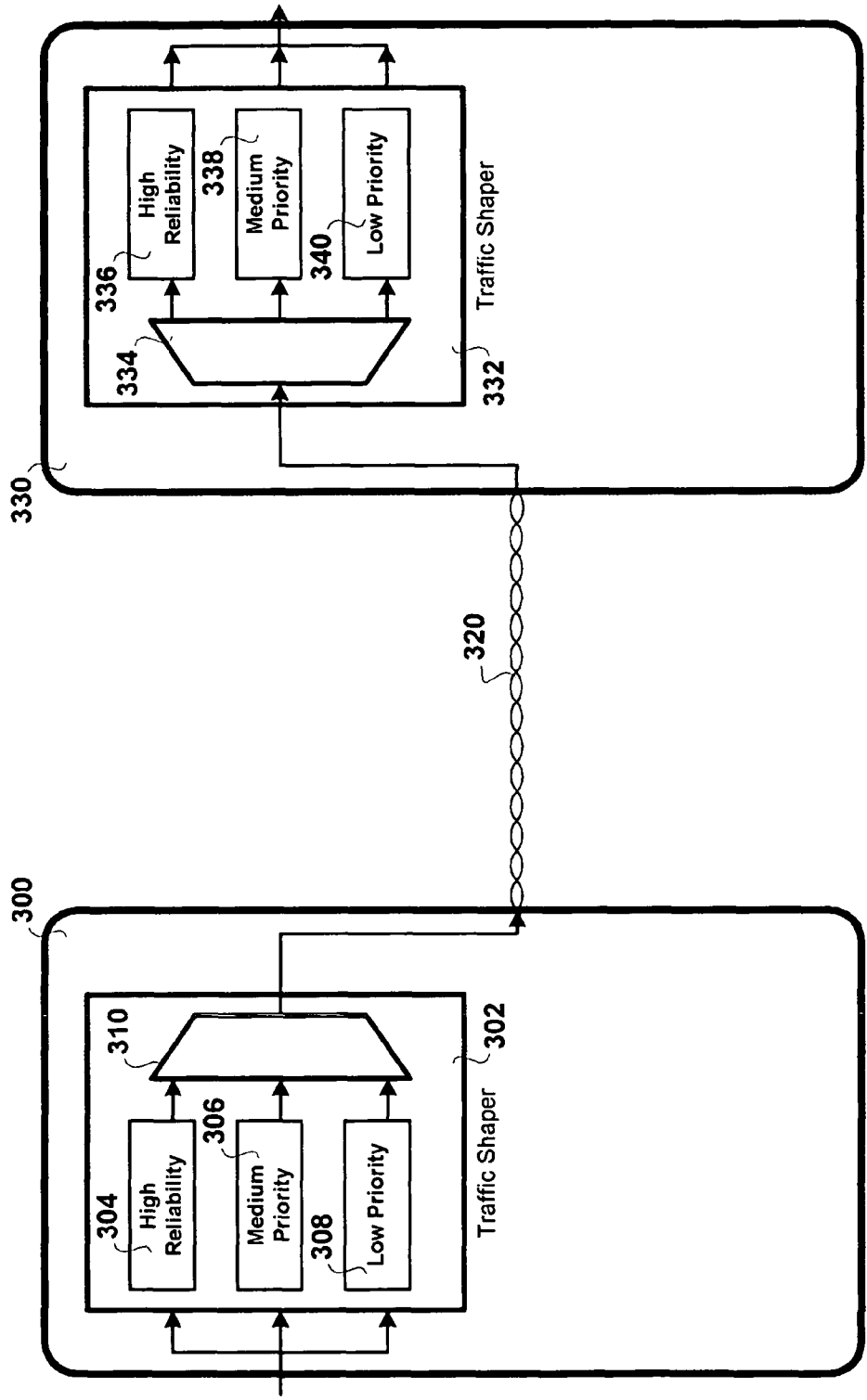
FIG. 3 is a hardware block diagram of an opposing pair of modems with quality of service dependant traffic control in accordance with an embodiment of the invention.

FIG. 3 is a hardware block diagram of an opposing pair of modems 300, 330 with quality of service dependant traffic control in accordance with an embodiment of the invention. Modem 300 includes a traffic shaper 302 which takes data to be transmitted and prioritizes it into a high reliability buffer 304, a medium priority buffer 306 and a low priority buffer 308 each coupled via multiplexer 310 to the subscriber line 320. The multiplexer prioritizes data transmissions from each buffer based on corresponding quality of service (QOS) level and multiplexes it onto subscriber line 320. On the receiving modem a corresponding traffic shaper 332 further expedites QOS processing with a demultiplexer 334 and corresponding high reliability buffer 336, medium priority buffer 338 and low priority buffer 340. The traffic control capabilities of the modems in accordance with this embodiment of the invention, is utilized to maintain an 'always live' communication channel between opposing modems. Modems adapt to service higher priority traffic first without dropping the line.

FIG. 4 is a hardware block diagram of a modem 400 with feedback controlled signal-to-noise ratios and error correction in accordance with an embodiment of the invention. The modem is configured to implement dynamic iterative feedback control with a similarly configured opposing modem (not shown). The modem includes a receiver 410, a transmitter 440 both of which couple to a wire line communication medium (not shown) via an analog front end 470. The receiver includes components coupled to one another to form a receive path. The receive path components include: a low noise amplifier 412, a discrete Fourier transform (DFT) component, a dynamic demapper 416, a tone reorderer 418 and a deframer module 420. The deframer module includes a dynamic FEC decoder 422, a codeword buffer 424 a deframer component 426 an error detector 428 a signal to noise estimator 430, a feedback control 432, a memory 434 and program code 436. The transmit path components include: a framer module 442, a tone orderer 454, a dynamic mapper 456, an inverse discrete Fourier transform (IDFT) and a line driver 460. The framer module 442 includes a dynamic FEC encoder 448, a codeword buffer 446, a framer component 444, an error detector 450 and a traffic shaper 452.

In operation received codewords are temporarily stored in buffer 424 after decoding in FEC decoder 422. The error detector 428 identifies errored codewords on the basis of relative indicia such as superframe, frame and offset within a frame or absolute indicia such as a unique shared id for each codeword shared between the transmitting and receiving ones of the modems. The signal-to-noise estimator 430 determines when a modification of transmit control parameters such as: Forward Error Correction (FEC) codeword size, FEC codeword rate, power spectral density (PSD) and constellation size is to take place. The feedback controller handles both the sending of requests to a similarly configured opposing modem (not shown) for retransmission of errored codewords as well as the determination and sending of modifications to the transmit control parameters to reduce a difference between actual and target signal-to-noise ratios (SNR) for communications from the opposing modem received by the receiver 410. The sending of both codeword retransmission requests and modified control parameters is accomplished by the coupling between the feedback control 432 and the framer module of the modem's transmitter 440.

Subsequent to sending the modified control parameters a changeover in transmit control parameters is synchronized on the receiver of modem 400 and the transmitter of the opposing modem (not shown). These changes take place dynamically in response to errored codewords and/or changes in signal-to-noise ratios (SNR) detected by the receiving modem using the modified transmit control parameters determined by the receiving modem. These changes occur without a requirement of retraining and the corresponding loss/interruption of throughput associated with retraining.

Similarly in the transmitter of the opposing modem components corresponding to dynamic mapper 456, dynamic FEC encoder 448 are configured with the modified transmit control parameters. A component corresponding to traffic shaper 452 handles the prioritizing of transmitted data based on associated quality of service (QOS) levels.

The dynamic feedback control of the current invention is not limited to multi-tone or other modems which utilize Fourier transform components such as shown in the embodiment of FIG. 4. The scope of the claimed invention also includes modems implementing other wire line modulation protocols; for example carrierless amplitude phase quatrature amplitude modulation (CAP-QAM).

FIG. 5A is a graph 500 of throughput versus loop length for the embodiment of the modem shown in FIG. 4. Line 502 shows throughput vs. loop-length for prior art modems. Line 504 shows actual throughput using the dynamic feedback control of the current invention. Line 506 shows the coding efficiency of the current invention.

FIG. 5B is a graph of the percent change in throughput versus time, line 554, and noise versus time, line 552, for the embodiment of the modem shown in FIG. 4 over a resynchronization interval spanning 40 ms. The dashed line 552 shows stationary noise increasing from 1 to 5 db over a 40 ms interval. The solid line 554 shows an initial throughput of 100 percent over an interval of 0-2 ms, followed by intermediate throughput levels of 85% @2-30 ms and 55% @30-40 ms and a final throughput after synchronization at 75% of the initial level. In order to maintain throughput of user data during synchronization either or both codeword size and code rate is decreased to ensure ongoing transfer of user audio, video, text or other priority data during resynchronization. Code rate is defined as the quotient of message/user data bytes in the numerator divided by codeword size in the denominator. During each of the above discussed intervals a corresponding ellipsis indicates representative codeword and message block sizes for a representative FEC encoding, e.g. Reed-Solomon. During the intermediate resynchronization intervals codeword size and codeword rate is decreased from 240 to 64 bytes and the user data, a.k.a. message portion of the codeword decreases more than proportionately from 224 to 32 bytes. After synchronization codeword size and message size are returned to their initial sizes, e.g. 240 and 224 bytes respectively.

In alternate embodiments of the invention where FEC codeword may be generated by other FEC block or convolutional codes without departing from the scope of the claimed invention. In the case of convolutional type FEC codewords a different generating polynomial would be used during the resynchronization interval.

Figure 6:
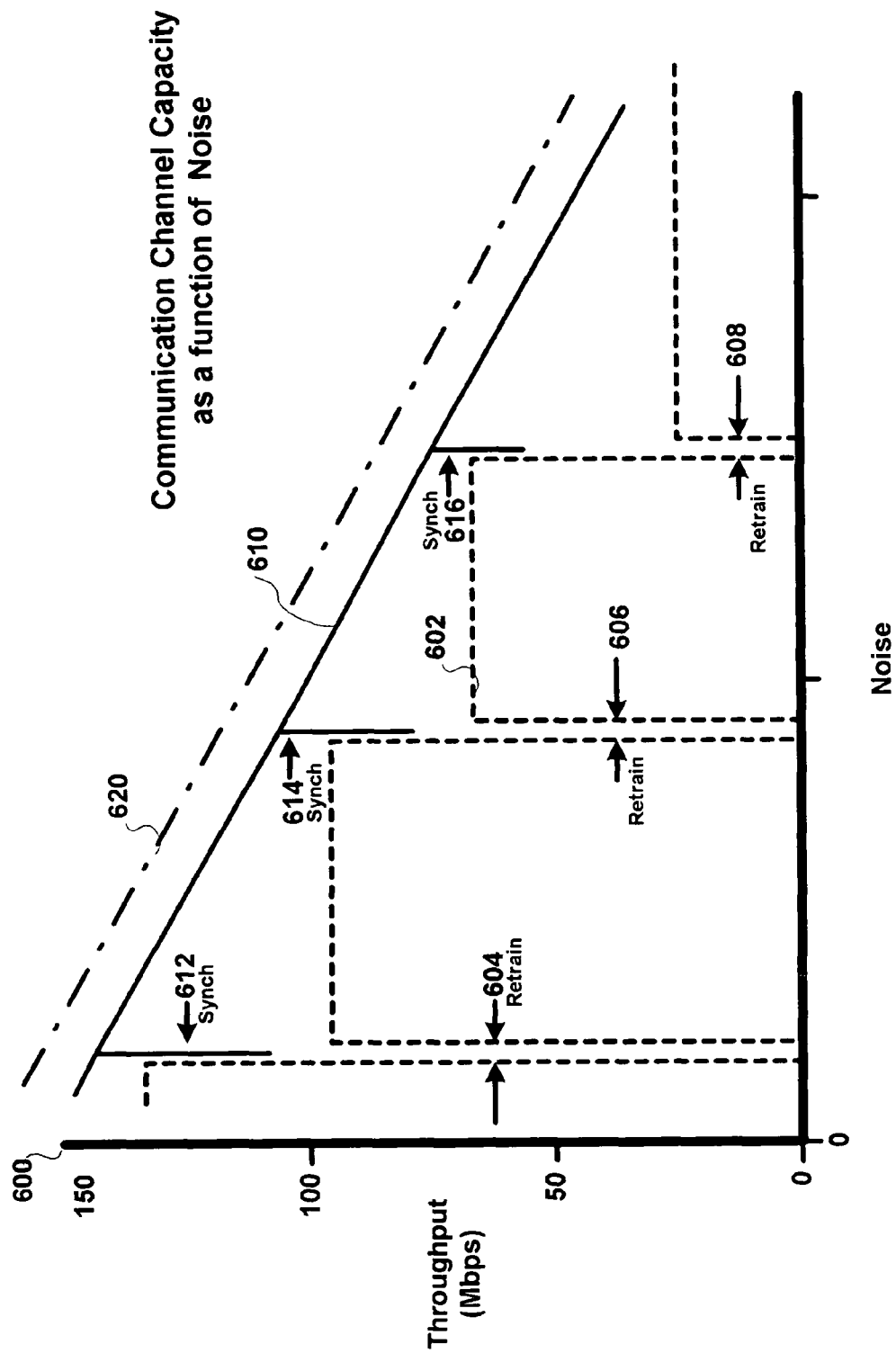
FIG. 6 is a graph of throughput versus noise for the modem noise for the embodiment of the modem shown in FIG. 4.

FIG. 6 is a graph of throughput versus noise for the embodiment of the modem shown in FIG. 4. The dashed line 602 shows the discontinuous throughput associated with prior art modems in which increases in noise level require a total loss of user data throughput during retraining intervals 604, 606, 608 of opposing modems which may span intervals of 3-10 seconds.

The lines 610, 620 shows the higher actual and theoretical throughput levels respectively associated with the modem of FIG. 4. No retraining is required, since feedback control from the receiving modem is used to repetitively modify transmit control parameters for the opposing modems. Resynchronization intervals 612, 614, 616 of 30-40 ms in duration are shown. During these resynchronization intervals throughput is not totally lost, rather only fractionally degraded. This uninterrupted throughput, a.k.a. 'always live', capability of the modem of the current invention makes it ideally suited for Video on Demand and other services where interruptions of any nature are not acceptable.

Figure 7:
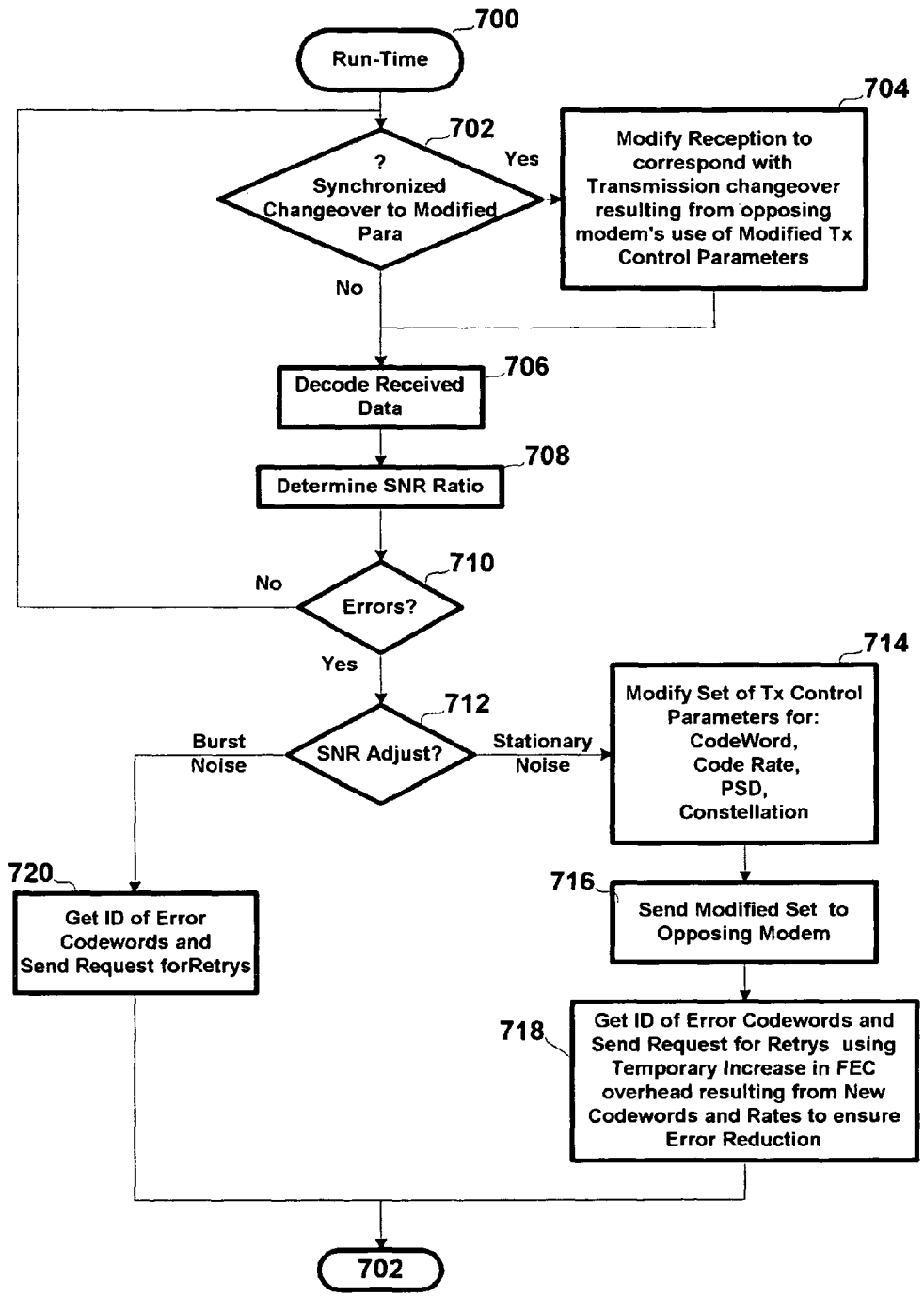
FIG. 7 is a process flow diagram of the dynamic feedback control processes performed on the receive path of the embodiment of the modem shown in FIG. 4.

FIG. 7 is a process flow diagram of the dynamic feedback control processes performed on the receive path of the embodiment of the modem shown in FIG. 4. Processing begins in process block 800 in which the runtime phase of modem communication has been initiated. Runtime is initiated after the setup and training phases of the modems operation. Control is passed to decision process 802 in which a changeover in one or more of the following control parameters: Forward Error Correction (FEC) codeword size, FEC codeword rate, power spectral density (PSD) and constellation size is to take place. These changeover is synchronized on the receiving and transmitting modem. These changes take place dynamically in response to errored codewords and/or changes in signal-to-noise ratios (SNR) detected by the receiving modem using the modified transmit control parameters determined by the receiving modem. These changes occur without a requirement of retraining and the corresponding loss/interruption of throughput associated with retraining.

If such a change is taking place control passes to process 704 and if not then to process 706. In process 704 the components which form the receive path of the modem alter the required control parameters synchronously with the opposing transmitting modem so as to avoid loss of throughput or interruption of service. Control then passes to process 706. In process 706 received data is decoded. Then in process 708 the actual SNR for the received communication channel is determined. Next, control passes to decision process 710 in which a determination is made as to whether there are any errored FEC codewords in the data received in process 706. If no errors are detected control returns to decision process 702, or alternately, if errors are detected to decision process 712.

In decision process 712 a determination is made as to whether an adjustment of signal-to-noise ratios is required. The criteria for this adjustment determination include the difference between the actual SNR repetitively determined in process 708 and a target SNR. Target SNR includes the operating SNR of the modem plus any additional margin required for the operation. The dynamic feedback control techniques of the current invention allow for SNR margins of 1 decibel, which are orders of magnitude below the 6-15 db SNR required by prior art modems. The adjustment determination criteria also include the type of noise involved, e.g. transient or stationary. Transient, a.k.a. 'burst noise' is of short duration relative to the depth of the codeword buffers 424, 446 shown in FIG. 4. In an embodiment of the invention 'burst' noise exhibits a duration less than 500 ms. Noises greater in duration are identified as 'stationary'.

If a determination is made in decision process 712 that the noise type is 'burst noise' then control passes to process 720. In process 720 each errored codeword is identified. Identification can be made on the basis of relative indicia such as superframe, frame and offset within a frame or absolute indicia such as a unique shared id for each codeword shared between the transmitting and receiving ones of the modems. The relative or absolute indicia are sent from the receiving modem to the transmitting modem to initiate retransmission of the codewords received with errors. In an embodiment of the invention retransmission options include the complete codewords or portions thereof, as dictated by the receiving modem. Control then returns to process 702.

Alternately, if a determination is made in decision process 712 that the noise type is stationary then control passes to process 714. In process 714 a change in one or more of the following control parameters: Forward Error Correction (FEC) codeword size, FEC codeword rate, power spectral density (PSD) and constellation size is to take place for communications between the transmitting and receiving modem. The receiving modem initiates this changeover with modifications to the existing parameters, e.g. a change in one or more of the control parameters. The determination takes into account both feedback and throughput efficiency. The modified set of one or more parameters or indicia corresponding with same are sent from the receiving modem to the transmitting modem in process 716. In the next process 718 the ID of errored FEC codewords is obtained and a request for re-transmission is sent to the opposing modem. A smooth changeover without interruption of throughput may require a temporary decrease in codeword size and an increase in the FEC component of each codeword relative to the data component of each codeword. Once the communications between the changeover in control parameters has been effected by the transmitting and receiving modems, code rates and sizes are returned to more efficient levels, as shown in FIG. 5B.

Figure 8:
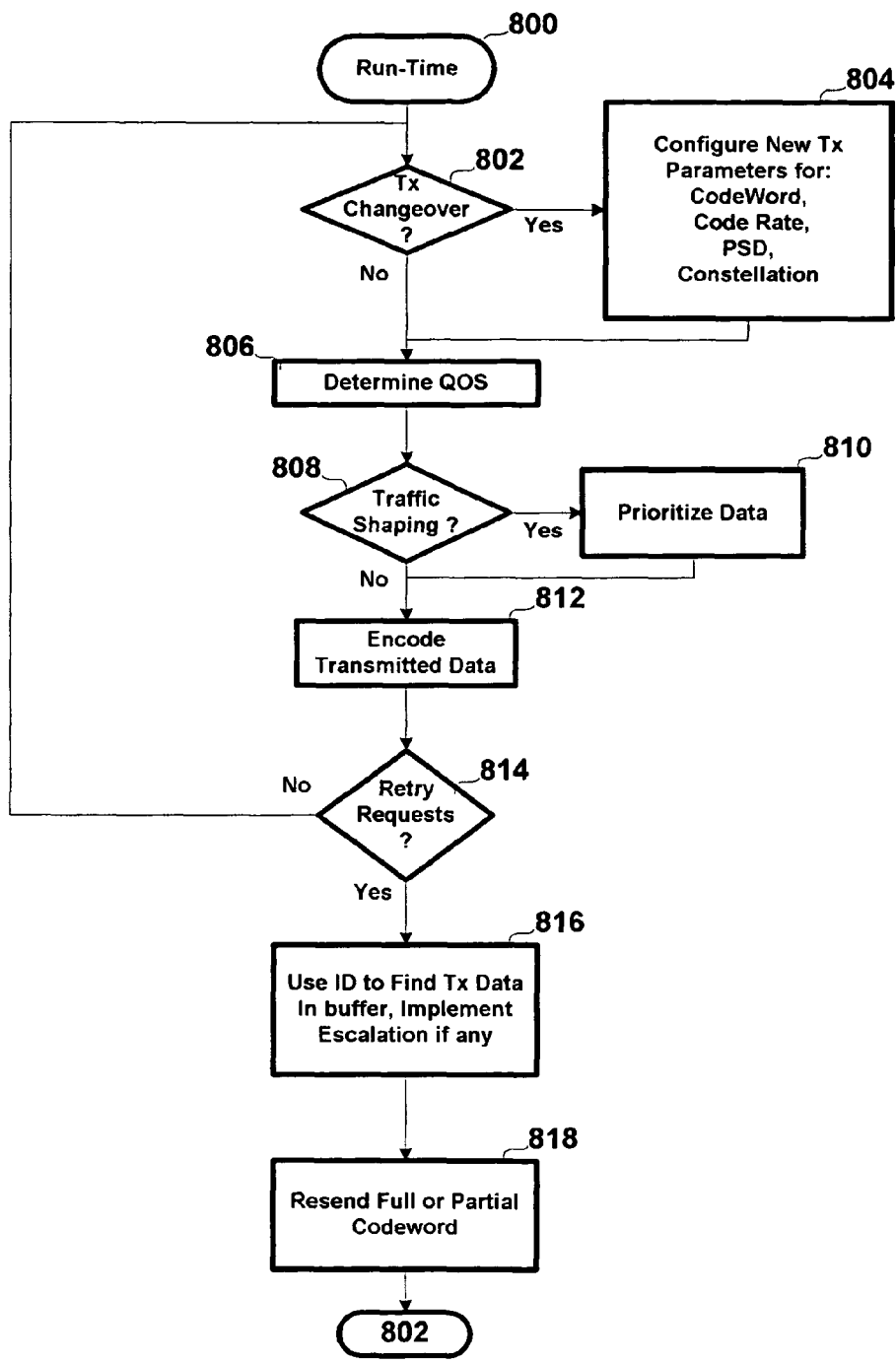
FIG. 8 is a process flow diagram of the dynamic feedback control processes performed on the transmit path of the embodiment of the modem shown in FIG. 4.

FIG. 8 is a process flow diagram of the dynamic feedback control processes performed on the transmit path of the embodiment of the modem shown in FIG. 4. Processing begins in process block 800 in which the runtime phase of modem communication has been initiated. Runtime is initiated after the setup and training phases of the modems operation. Control is passed to decision process 802 in which a changeover in one or more of the following control parameters: Forward Error Correction (FEC) codeword size, FEC codeword rate, power spectral density (PSD) and constellation size is to take place. These changeover is synchronized on the receiving and transmitting modem. These changes take place dynamically in response to errored codewords and/or changes in signal-to-noise ratios (SNR) detected by the receiving modem using the modified transmit control parameters determined by the receiving modem. These changes occur without a requirement of retraining and the corresponding loss/interruption of throughput associated with retraining.

If such a change is taking place control passes to process 804 and if not then to process 806. In process 804 the components which form the transmit path of the modem alter the required control parameters synchronously with an opposing receiving modem so as to avoid loss of throughput or interruption of service. Control then passes to process 806. In process 806 the transmitting modem determines the quality of service (QOS) requirements of each packet of the transmitted data. Typically video has a higher QOS than audio, which in turn has a higher QOS then a file or document transfer. Next in decision process 808 a determination is made as to traffic shaping. Traffic shaping is implemented by the transmitting modem to avoid interruption of service, i.e. to keep the modem line 'Always Live' and to meet QOS targets. If a determination is made that traffic shaping is required to meet QOS targets then control is passed to process 810 in which the packets are prioritized and packets with higher priority are transmitted before those with a lower priority. Control then passes to process 812 in which the data is encoded with the corresponding FEC. Control then passes to decision process 814. In decision process 814 a determination is made as to whether any indicia of errored codewords have been received from the opposing receiving modem. If errored codewords have been identified control passes to process 816, and if not control returns to decision process 802. In decision process 816 the absolute or relative indicia sent from the receiving modem (See process 720, FIG. 7) are used to identify the corresponding data in the codeword buffer 446 of the transmitting modem, and in the following process 818 the codeword(s) are retransmitted. In an embodiment of the invention the codeword itself comprising the data and FEC portions may be subject to another level of encoding to add additional FEC capacity before transmission. Control then returns to decision process 802.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A method for communication between a pair of modems coupled to opposing ends of a wire line communication medium for multi-tone modulated X-DSL communications thereon, and the method comprising:

detecting errored forward error correction (FEC) codewords during decoding of received FEC encoded data on the first of the pair of modems;

sending indicia identifying the errored FEC codewords detected in the detecting act from the first to a second of the pair of modems;

finding, on the second of the pair of modems, buffered data associated with the errored FEC codewords identified by the indicia received from the first of the pair of modems in the sending act; and re-transmitting corresponding FEC codewords associated with the buffered data found in the finding act from the second to the first of the pair of modems responsive to the indicia received from the first of the pair of modems in the sending act and wherein the detecting and sending acts further comprises:

iteratively determining a signal to noise ratio (SNR) of a received data on the first of the pair of modems;

characterizing a type of noise as transient or stationary based on a duration thereof;

initiating a changeover in transmit control parameters including at least one FEC encoding parameter of the corresponding codewords including: FEC codeword size and FEC code rate responsive to a stationary type noise characterization in the characterizing act; and avoiding a changeover in transmit control parameters responsive to a transient type noise characterization in the characterizing act.

* * * * *